Jan. 9, 1923.

W. A. CHRYST.
ELECTRIC SWITCH.
FILED MAY 22, 1920.

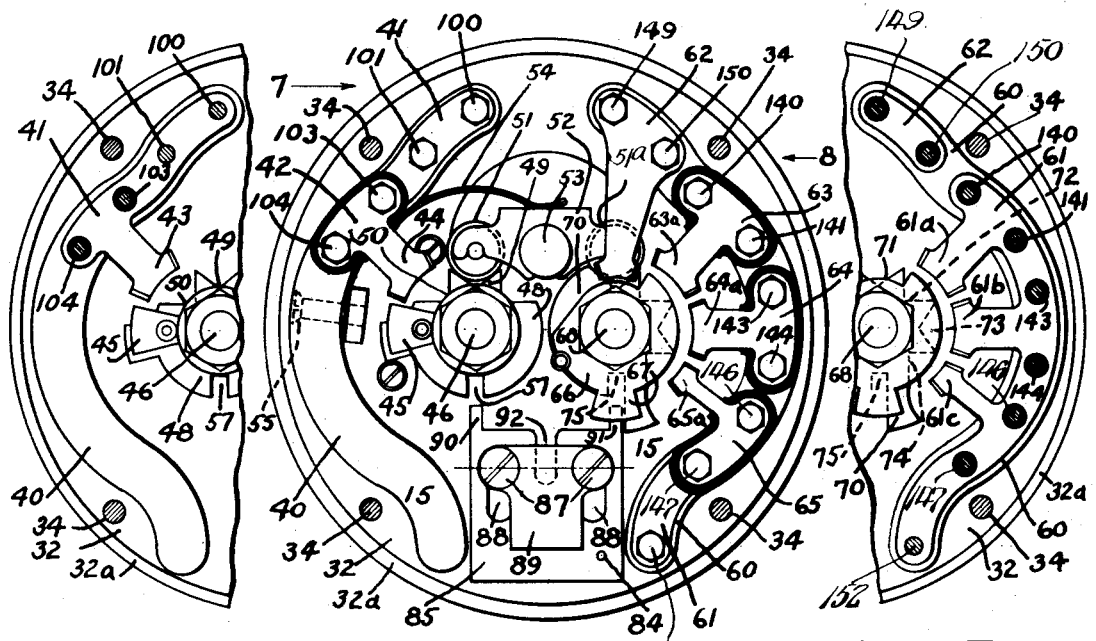

Jan. 9, 1923.
W. A. CHRYST.
ELECTRIC SWITCH.
FILED MAY 22, 1920.
1,441,398
6 SHEETS-SHEET 3
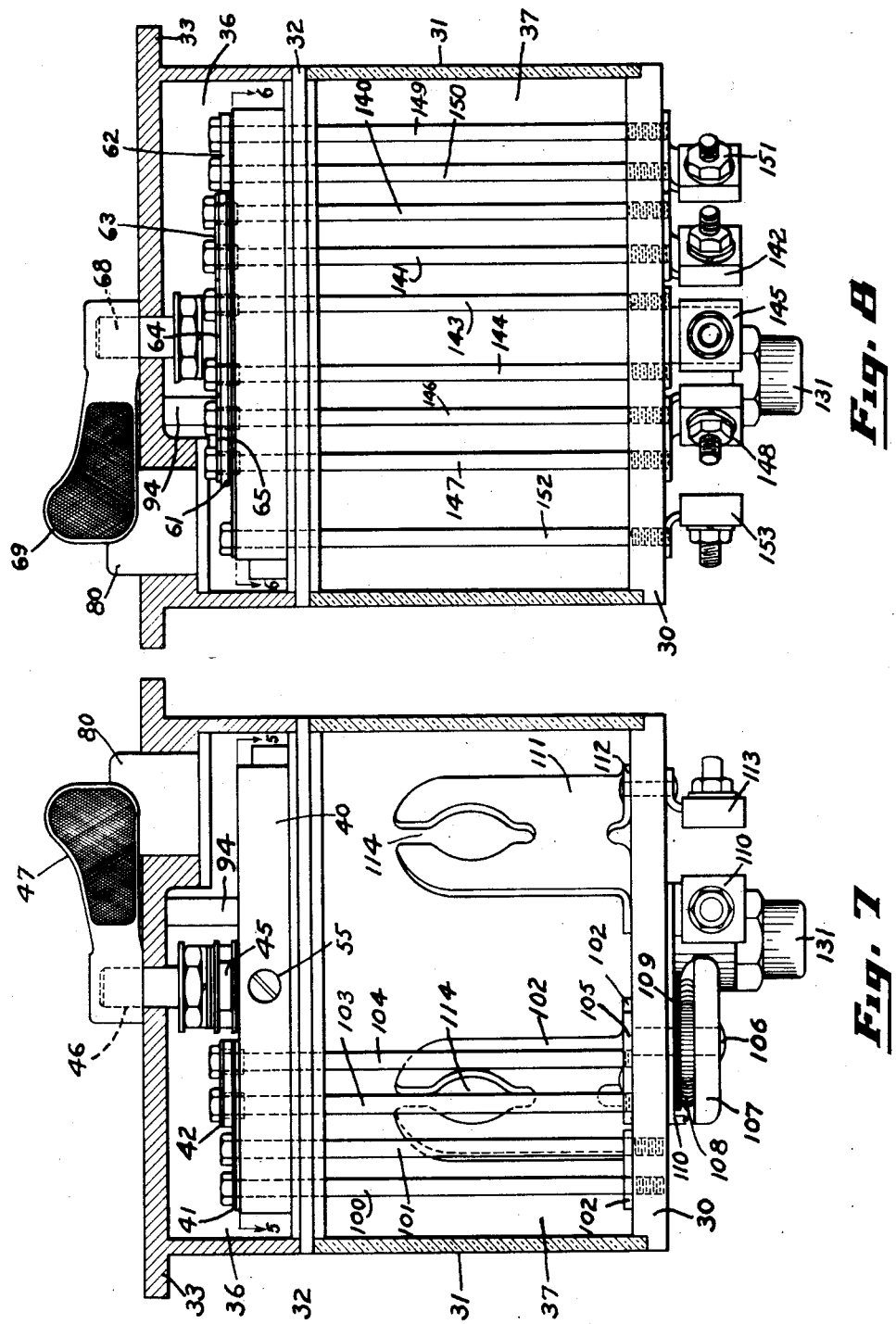

Jan. 9, 1923.

W. A. CHRYST.
ELECTRIC SWITCH.
FILED MAY 22, 1920.

Witnesses
Irvin A. Greenwald
Walter W. Ruedel

Inventor
William A. Chryst
By Frederick J. Hardman
Attorney

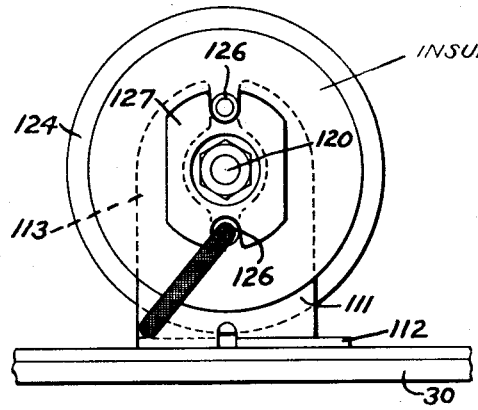
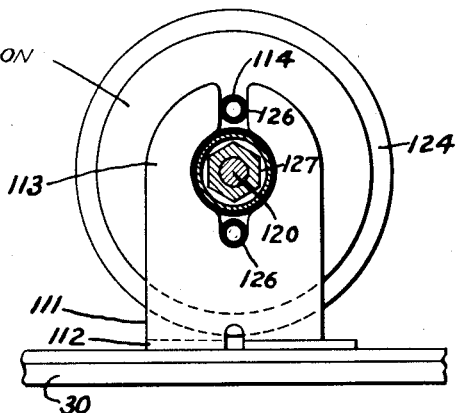
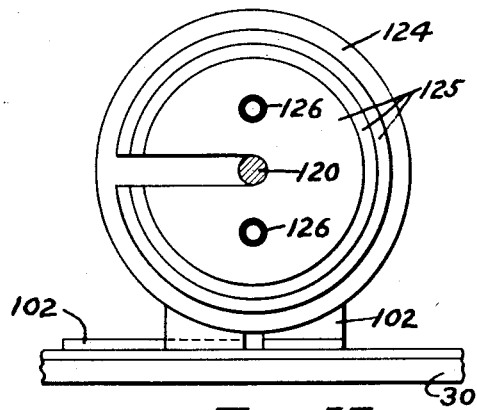
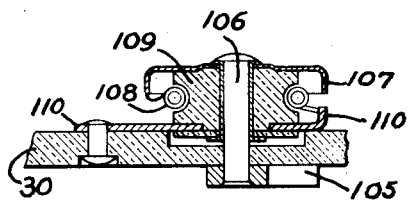
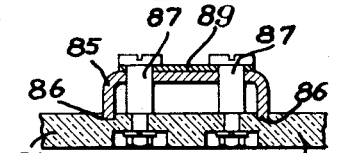
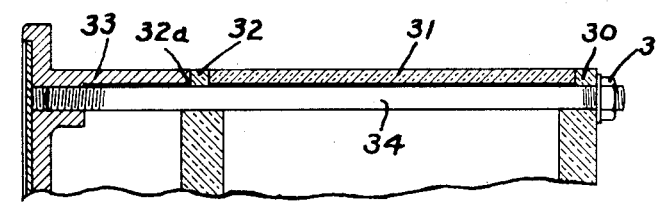

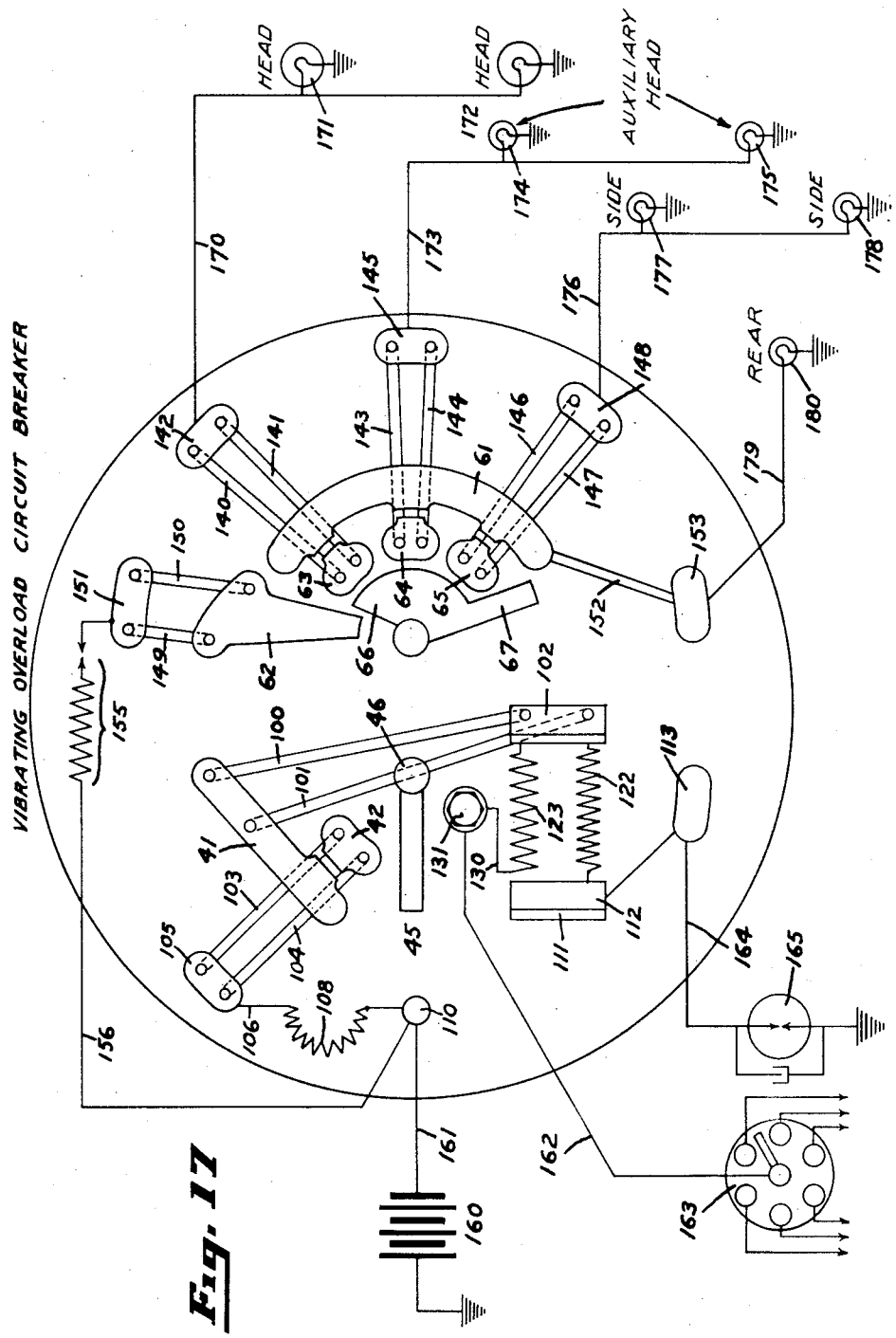

Patented Jan. 9, 1923.

1,441,398

UNITED STATES PATENT OFFICE.

WILLIAM A. CHRYST, OF DAYTON, OHIO, ASSIGNOR TO THE DAYTON ENGINEERING LABORATORIES COMPANY, OF DAYTON, OHIO, A CORPORATION OF OHIO.

ELECTRIC SWITCH.

Application filed May 22, 1920. Serial No. 383,408.

*To all whom it may concern:*

Be it known that I, WILLIAM A. CHRYST, a citizen of United States of America, residing at Dayton, county of Montgomery, State of Ohio, have invented certain new and useful Improvements in Electric Switches, of which the following is a full, clear, and exact description.

This invention relates to electrical systems and particularly to automotive vehicles requiring electrical ignition apparatus and electric lamps.

One of the objects of the invention is to simplify the electrical system in such a manner that there will be a minimum number of external conductors. One manner of carrying out this object of the invention is to provide a unitary structure which shall include devices for controlling the lighting and ignition circuits, a portion of the ignition apparatus such as the ignition coil and ignition resistance, and also any circuit protecting devices such as vibrating or lock-out circuits breakers.

In this connection it is a further object of the invention to provide a combined switch and ignition coil which is so constructed as to assist in preventing theft of the automobile. In carrying out this object the unitary device including the switch and ignition coil is so constructed that it cannot be taken apart except when unlocked, and if it is disassembled, the ignition apparatus will be rendered inoperative.

Other and further objects of the present invention will be apparent from the following description, reference being had to the accompanying drawings.

Figure 1:
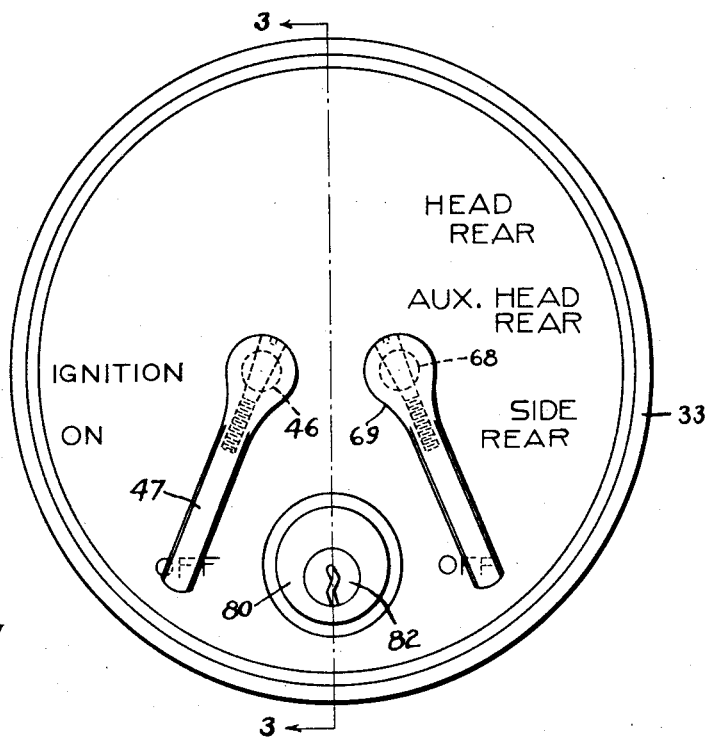
Fig. 1 is a front view of the unitary switch and coil structure embodying the present invention.
Figure 9:
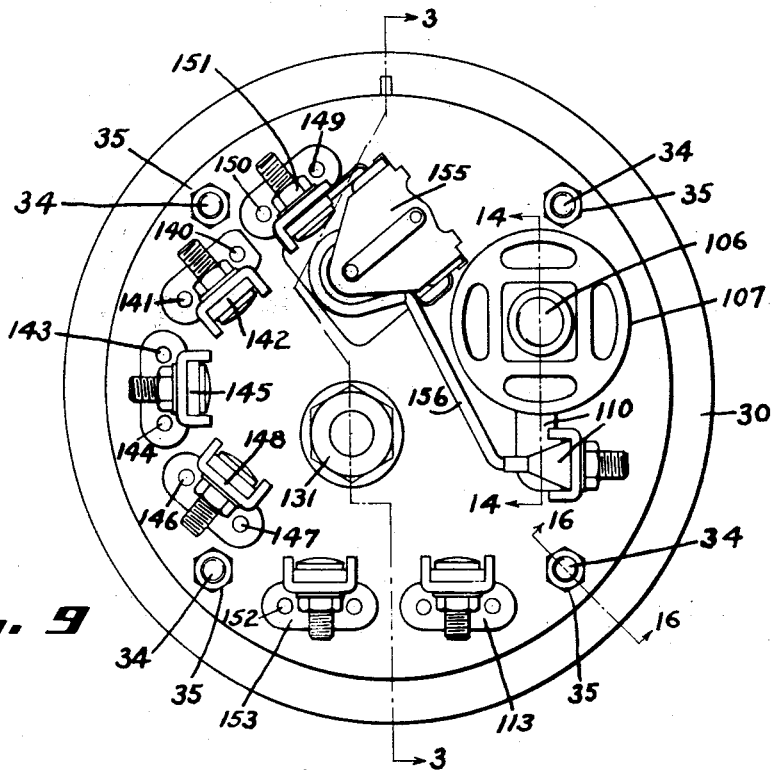
Figure 10:
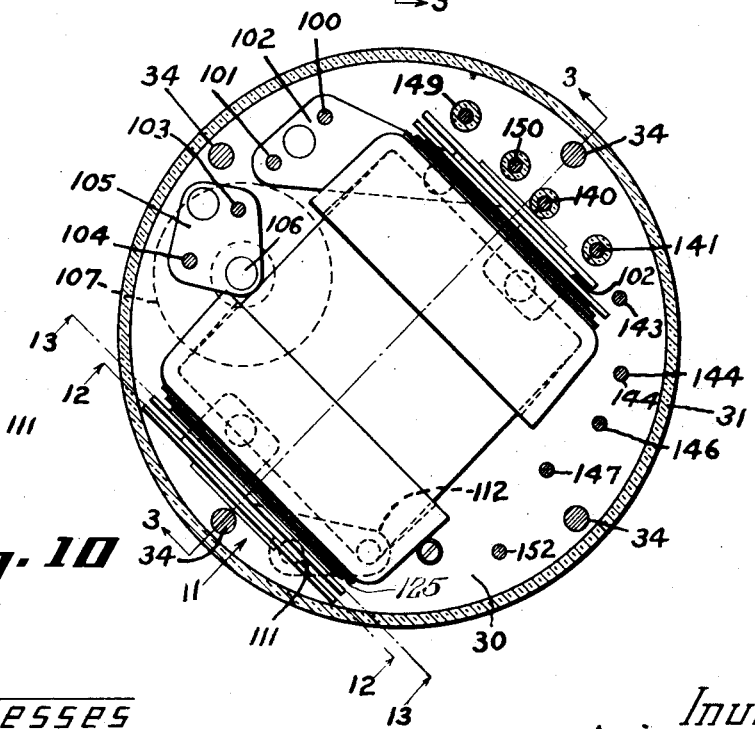

Fig. 3 is a composite sectional view of the switch and coil unit, the sectional view of the switch being taken on the line 3—3 of Fig. 1, the sectional view of the coil being taken on the line 3—3 of Fig. 10, and the sectional view of the terminal block being taken on the line 3—3 of Fig. 9;

Fig. 4 is an end view of the unit looking in the direction of the arrow 4 of Fig. 3 with the switch handles and the switch cover removed;

Fig. 5 is a fragmentary end view of certain parts shown in Fig. 4, partly in section, the section being taken on the line 5—5 of Fig. 7;

Fig. 6 is a fragmentary end view of certain parts shown in Fig. 4, partly in section, the section being taken on the line 6—6 of Fig. 8;

Fig. 7 is a side elevation partly in section of the unit looking in the direction of the arrow 7 in Fig. 4, certain parts being omitted;

Fig. 8 is a side elevation partly in section of the unit looking in the direction of the arrow 7 in Fig. 4, certain parts being omitted;

Fig. 9 is a rear end view of the unit looking in the direction of arrow 9 in Fig. 3;

Fig. 10 is a sectional view of the coil housing and a plan view of the coil, the section being taken on the line 10—10 of Fig. 3;

Fig. 11 is an end view of the coil and coil bracket looking in the direction of the arrow 11 of Fig. 10;

Fig. 12 is a sectional view taken on the line 12—12 of Fig. 10;

Fig. 13 is a sectional view taken on the line 13—13 of Fig. 10;

Fig. 14 is a fragmentary sectional view of the ignition resistance element taken on the line 14—14 of Fig. 9;

Fig. 15 is a sectional view taken on the line 15—15 of Fig. 4;

Fig. 16 is a fragmentary sectional view taken on the line 16—16 of Fig. 9; and

Fig. 17 is a wiring diagram showing the circuits in the switch and coil unit and connections therewith leading to the battery and the light circuits, and to the ignition apparatus.

Figure 2:
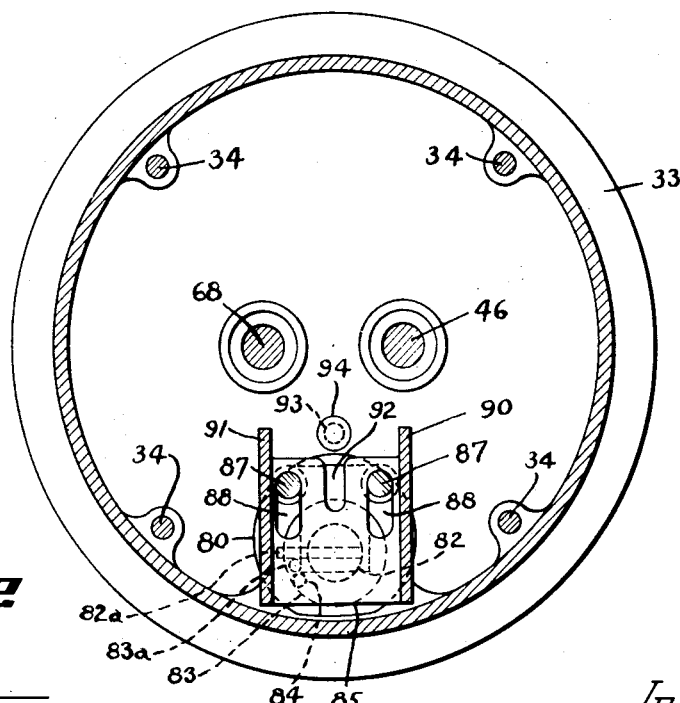
Fig. 2 is a sectional view taken on the line 2—2 of Fig. 3.

Referring particularly to Figs. 3 and 16, the switch and coil unit includes a terminal block 30 and coil shell 31, switch base 32 and a switch cover 33, which are connected together by means of studs 34 (see also Figs. 2 and 9) having threaded engagement with the switch cover 33 and passing through holes in members 32 and 30 and engaging with nuts 35. This structure forms a switch housing 36 and a coil housing 37.

Switch base 32 is provided with an outwardly extending non-conducting boss 40 supporting ignition switch stationary contacts 41 and 42 which are insulated from each other. Contacts 41 and 42 are provided with similarly shaped and spaced projections 43 and 44, respectively, which are adapted to be bridged by ignition switch movable contact 45, which is mounted upon ignition switch shaft 46 but insulated therefrom. Shaft 46 is journalled upon switch base 32 and cover 33 and is provided with ignition switch handle 47. The shaft 46 carries a detent plate 48 provided with notches 49 and 50 adapted to receive roller 51 supported by an arm 52 pivotally mounted upon stud 53 which projects over the switch base 32. A spring 54 attached by means of screw 55 to boss 40 yieldingly maintains the lever 52 in the position shown in Fig. 4, with the roller 51 yieldingly pressed into either the notch 49 or the notch 50 depending respectively on whether the lever 47 is in its "off" or "on" position. Detent plate 48 is provided with a notch 57, the function of which is to be described.

The non-conducting boss 60 projects from the switch boss 32 and supports light-switch stationary contacts 61 and 62, and contacts 63, 64 and 65 which are insulated from contacts 61 and 62. Contact 61 is provided with projections $61^a$, $61^b$ and $61^c$ which are shaped similarly to and spaced from projections 63a, 64a, and 65a, respectively, of contacts 63, 64 and 65. The light-switch contact 66 may be moved to engage with contact 62 and is provided with a projection 67 adapted to bridge contact projections $61^a$, 63 or $61^b$, $64^a$ or $61^c$ and $65^a$, depending upon the position into which the contact 66 is turned. Contact 66 is mounted upon light-switch shaft 68, which is journalled upon switch base 32 and switch cover 33 and is provided with a handle 69. Shaft 68 is provided with a detent plate 70 provided with spaced notches 71, 72, 73 and 74, adapted when turned to the proper positions to receive a roller $51^a$ carried by the lever 52, whereby the switch shaft 68 is yieldingly maintained in adjusted position. Detent 70 is provided with a notch 75 for a purpose to be described.

The switch cover 33 supports a cylinder lock 80 which is controlled by a key 81 by means of which the locking sleeve 82 is moved. Sleeve 82 is provided with a pin $82^a$ which cooperates with pin $83^a$ carried by plate 83 which is journalled upon sleeve 82. Pin $83^a$ transmits motion from pin $82^a$ to a pin 84 carried by locking bolt 85, to unlock the switches. Bolt 85 is slidably mounted in grooves 86 provided in switch base 32. (See Fig. 15.) Bolt 85 is retained in position by means of bolts 87 passing through slots 88 provided in bolt 85. The heads of bolts 87 cooperate with a leaf spring 89 to maintain the locking bolt 85 yieldingly in the position shown in Figs. 4 and 15. Bolt 85 is provided with projections 90 and 91 for entering into the detent notches 57 and 75 for locking the ignition and light switches in open position. Locking bolt 85 is provided with a notch 92 which is adapted to engage with groove 93 formed in a stud 94 projecting inwardly from the cover 33. It can be seen that when the locking bolt 85 is in position to lock the detents 48 and 70, the cover 33 will be locked in position with respect to the switch base 32. Although the bolts 34 may be removed without unlocking the switch, yet the switch cover 33 cannot be removed when the switch is locked, since endwise movement of the switch cover 33 with respect to the switch base 32 is prevented by virtue of the cooperation between locking bolt 85 and the stud 94, and movement of the switch cover 33 upwardly to the base 32 is prevented since the switch cover 33 fits into an annular recess $32^a$ formed in the base 32.

The ignition switch stationary contact 41 is held in position by means of bolts 100 and 101 which extend through the coil housing 37 and have screw threaded engagement with ignition coil bracket 102 located on the inside of terminal block 30. Ignition switch stationary contact 42 is secured in position by means of bolts 103 and 104 which are insulated from contact 41 and which pass through coil housing 37 and have threaded engagement with ignition resistance terminal plate 105 which is located upon the inner side of terminal block 30. Referring to Fig. 14, terminal 105 is connected with a rod 106 having electrical connection with resistance element cover 107 which is attached to resistance element 108 which encircles a non-conducting support 109. Resistance element 108 is connected with terminal 110. Base 30 supports a second coil bracket 111 having a foot 112 which is connected with ignition terminal 113.

Each coil bracket 102 and 111 is provided with upstanding portions which are similarly shaped, one of these portions being shown by numeral 113 in Figs. 11 and 12. Portions 113 are each provided with a notch 114 for receiving the coil assembly which will now be described. The coil is constructed in accordance with the invention described and claimed in the copending application of John H. Hunt, Serial No. 255,257, filed September 23, 1918. The coil includes a core comprising a center bolt 120 surrounded by a bundle of iron wires 121. The primary winding 122 and secondary winding 123 surround the core and are partially enclosed within non-conducting end bells 124. The bolt 120 supports outside of bells 124 a series of notched discs 125 for assisting in the concentration of the magnetic field as described more particularly in the application referred to. The primary and secondary terminals are brought out through certain of the hollow non-conducting pegs 126 which also cooperate with the slots 114 of brackets 102 and 111, whereby to assist in locating the coil in correct position upon the coil brackets. Dished washers 127 cooperate with the bolt 120 and with the rounded portions of the notches 114 to secure the coil in position upon the coil brackets. The brackets 102 and 111 are entirely insulated from each other and from the coil core. One end 130 of the secondary winding is attached to a terminal 131 and the other end is attached to coil bracket 102. One end of the primary winding 122 is attached to the coil bracket 102 and the other to the coil bracket 111.

Light-switch stationary contacts 61, 63, 64 and 65 are secured in position by means of bolts 140 and 141 which are insulated from contact 61 but electrically connect contact 63 with light-switch terminal 142; by means of bolts 143 and 144 which are insulated from contact 61 but electrically connect contact 64 with light-switch terminal 145; and by means of bolts 146 and 147 which are insulated from contact 61 but connect contact 65 with light-switch terminal 148. The light-switch stationary contact 62 is connected by means of bolts 149 and 150 with vibrating overload circuit breaking terminal 151. Contact 61 is connected by means of bolt 152 with light-switch terminal 153.

By referring more particularly to the wiring diagram, terminal 151 is connected with vibrating overload circuit breaker 155 which in turn is connected by wire 156 with terminal 110. Grounded battery 160 is connected by wire 161 with terminal 110. Wire 162 connects high tension terminal 131 with distributor 163, and wire 164 connects ignition terminal 113 with timer 165. Wire 170 connects light-switch terminal 142 with head lamps 171 and 172. Wire 173 connects light-switch terminal 145 with auxiliary head lamps 174 and 175. Wire 176 connects light-switch terminal 148 with side lamps 177 and 178. Wire 179 connects the light-switch terminal 153 with rear lamp 180.

To render the ignition system operative the switch lever 47 (see Fig. 1) is turned from "off" to "on" position causing the ignition switch movable contact 45 to bridge the contacts 41 and 42. The following primary circuit will be established: Battery 160, wire 161, terminal 110, resistance 108, rod 106, terminal 105, bolts 103 and 104, switch contact 42, contact 45, contact 41, bolts 100 and 101, coil bracket 102, primary winding 122, coil bracket 111, foot 112, terminal 113, wire 164 and grounded timer 165.

When the light-switch lever 69 is turned to the "Side rear" position indicated in Fig. 1, the light-switch movable contact 66 will be moved so as to engage the contact 62 and to bridge the contacts 61 and 65, and the following light circuits will be established. Grounded battery 160, wire 161, terminal 110, wire 156, vibrating overload circuit breaker 155, terminal 151, bolts 149 and 150, contact 62, contact 66, contact 61, bolt 152, terminal 153, wire 179 and grounded rear lamp 180. The side lamp circuit will branch out from contact 66 and will include contact 65, bolts 146 and 147, terminal 148, wire 176 and grounded side lamps 177 and 178.

In case the combination of auxiliary head and rear lamps is desired the lever 69 is turned to the "Auxiliary Head Rear" position indicated in Fig. 1. The contact 66 will remain in engagement with contact 62 and its projection 67 will now bridge contacts 61 and 64. Rear lamp 180 will still remain in the circuit but side lamps 177 and 178 will be cut out, but the following circuit will be established to auxiliary head lamps 174 and 175. This branch circuit includes contact projection 67, contact 64, bolts 143 and 144, terminal 145, wire 173 and grounded auxiliary head lamps 174 and 175.

In case the main head lamp and rear lamp combination is desired the lever 69 is turned still further to the "Head rear" position indicated in Fig. 1. The rear lamp will remain connected as before, but the auxiliary head lamps will be disconnected and the following branch circuit with the main head lamps will be established: contact projection 67, contact 63, bolts 140 and 141, terminal 142, wire 170 and grounded head lamps 171 and 172.

By providing a unitary structure comprising a coil and an ignition switch in the manner described there are but three external terminals which need to be connected up to complete the ignition system. These terminals are 110, 113 and 131. It is apparent that it would do no good to try to complete the ignition circuit by connecting together any of these terminals. If such a thing were done the ignition coil would be short circuited. The only way to complete the ignition circuit, without bridging across the switch contacts 41 and 42, is to connect up the terminal 110 or the resistance element 108 with the coil bracket 102. This can not be done without taking the unit apart because all of these connections between the resistance element 108 and the coil are all located within the structure and, therefore, are not accessible. As already described the coil and switch housing can not be disassembled without first unlocking the switch. The use of a combination lock, such, for example, as the tumbler lock shown, increases the time required to obtain access into the interior of the switch, thus decreasing the chances of a thief's escaping detection.

What I claim is as follows:

1. In a switch and coil unit for ignition systems, the combination with a switch base carrying contacts; of a terminal block carrying switch terminals; a shell interposed between said base and said block and cooperating with the same to provide a coil housing; an ignition coil located within said housing; and means traversing the coil housing for securing together said base, block and shell, and for electrically connecting certain switch contacts with certain switch terminals.

2. In a switch and coil unit for ignition systems, the combination with a switch base carrying contacts; of a terminal block carrying switch terminals; a shell interposed between said base and said block and cooperating with the same to provide a coil housing; an ignition coil located within said housing; and headed bolts passing through certain switch contacts and having screw threaded engagement with certain switch terminals.

3. In a switch and coil unit for ignition systems, the combination with a switch base carrying contacts; of a terminal block carrying switch terminals; a shell interposed between said base and said block and cooperating with the same to provide a coil housing; an ignition coil located within said housing and connected with certain terminals; head bolts passing through certain switch contacts and having screw threaded engagement with certain switch terminals; a cover for said switch base forming an enclosure for said switch contacts and bolt heads; and lock controlled means for preventing removal of the cover from the switch base whereby access to said bolt heads is prevented.

4. In a switch and coil unit for ignition systems, the combination with a switch base carrying stationary contacts; a movable contact; a switch cover cooperating with said base to provide an enclosure for said contacts; means passing through said cover to operate said contacts; a terminal block; an ignition coil supported by said terminal block and connected through said block with certain terminals; a coil shell interposed between said terminal block and said switch base and cooperating therewith to provide an enclosure for said coil; headed bolts passing through said stationary switch contacts and having screw threaded engagement with certain of said terminals whereby to secure said base, shell and block in predetermined relative positions; and lock controlled means for locking said movable contact in open position and for preventing removal of said switch cover whereby to prevent access to said headed bolts.

In testimony whereof I hereto affix my signature.

WILLIAM A. CHRYST.

Witnesses:
  LEE T. HOLLEN,
  C. D. MILLER.